(12) United States Patent
Hwang et al.

(10) Patent No.: US 9,600,244 B1
(45) Date of Patent: Mar. 21, 2017

(54) COGNITIVE EDITOR

(71) Applicant: INTERNATIONAL BUSINESS MACHINES CORPORATION, Armonk, NY (US)

(72) Inventors: Jinho Hwang, Ossining, NY (US); Minkyong Kim, Scarsdale, NY (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/963,560

(22) Filed: Dec. 9, 2015

(51) Int. Cl.
*G06F 9/44* (2006.01)

(52) U.S. Cl.
CPC . *G06F 8/33* (2013.01); *G06F 8/70* (2013.01)

(58) Field of Classification Search
CPC ..................................... G06F 8/33; G06F 8/70
See application file for complete search history.

(56) References Cited

U.S. PATENT DOCUMENTS

| | | | |
|---|---|---|---|
| 7,562,344 B1 * | 7/2009 | Allen ........................ | G06F 8/33 717/100 |
| 7,571,434 B1 * | 8/2009 | Kamen ..................... | G06F 8/70 717/142 |
| 8,819,617 B1 * | 8/2014 | Koenig ..................... | G06F 8/70 717/101 |

(Continued)

OTHER PUBLICATIONS

Bellamy, R., et al., Using CogTool to model programming tasks, Proceedings of Evaluation and Usability of Programming Languages and Tools (PLATEAU), 2010, 6 pages, [retrieved on Oct. 15, 2016], Retrieved from the Internet: <URL:http://dl.acm.org/>.*

(Continued)

*Primary Examiner* — Geoffrey St Leger
(74) *Attorney, Agent, or Firm* — Cantor Colburn LLP; Alexa Ashworth

(57) ABSTRACT

Embodiments include methods, and computer program products of cognitive programming editor system in a computer system. Aspects include: providing programmers' cognitive characteristics patterns and programming policies to a code controller, collecting computer code from programmers through cognitive skill agents, analyzing collected code by code controller using a cognitive vulnerability checker, providing collaborative programming by sharing online editor with programmers, and storing obtained cognitive characteristics patterns of programmers to a database. The analyzing may include assessing and responding to cognitive needs of the programmers through the cognitive skill agents. Cognitive vulnerability checker may include character pattern matching, type qualifier, data flow analysis, vulnerability pattern-based model checking, and individual programmer vulnerability analysis. The method also provides real-time feedback, real-time control of composite code, warnings, code control features, learns vulnerabilities over time, enforces programming policies, suggest programmer selection, and colorizing lines of code according to the vulnerability risk level for the programmers.

17 Claims, 4 Drawing Sheets

(56) References Cited

U.S. PATENT DOCUMENTS

| | | | | |
|---|---|---|---|---|
| 2003/0226131 | A1* | 12/2003 | Li | G06F 8/33 717/110 |
| 2005/0223354 | A1* | 10/2005 | Drissi | G06F 8/36 717/114 |
| 2008/0066049 | A1* | 3/2008 | Jain | G06F 8/70 717/101 |
| 2009/0089739 | A1 | 4/2009 | Mollicone et al. | |
| 2009/0319995 | A1* | 12/2009 | Gawor | G06F 8/33 717/125 |
| 2009/0328000 | A1* | 12/2009 | Neil | G06F 8/20 717/118 |
| 2011/0271246 | A1* | 11/2011 | Fujihara | G06F 8/20 717/104 |
| 2012/0167042 | A1 | 6/2012 | Tillmann et al. | |
| 2013/0007700 | A1* | 1/2013 | Villar | G06F 8/33 717/109 |
| 2013/0263086 | A1* | 10/2013 | Carter | G06F 8/33 717/113 |
| 2014/0317591 | A1* | 10/2014 | Rosomoff | G06F 8/70 717/101 |
| 2014/0372965 | A1* | 12/2014 | Alibakhsh | G06F 8/70 717/101 |
| 2015/0205600 | A1* | 7/2015 | Grillo | G06F 8/70 717/101 |
| 2016/0054983 | A1* | 2/2016 | Balasubramanian | G06F 11/3688 717/113 |

OTHER PUBLICATIONS

Oney, S., et al., Codelets: linking interactive documentation and example code in the editor, Proceedings of the SIGCHI Conference on Human Factors in Computing Systems, 2012, pp. 2697-2706, [retrieved on Oct. 15, 2016], Retrieved from the Internet: <URL:http://dl.acm.org/>.*

Xie, J., et al., ASIDE: IDE support for web application security, Proceedings of the 27th Annual Computer Security Applications Conference, 2011, pp. 267-276, [retrieved on Oct. 15, 2016], Retrieved from the Internet: <URL:http://dl.acm.org/>.*

Whitney, M., et al., Embedding Secure Coding Instruction into the IDE: A Field Study in an Advanced CS Course, Proceedings of the 46th ACM Technical Symposium on Computer Science Education, 2015, pp. 60-65, [retrieved on Oct. 15, 2016], Retrieved from the Internet: <URL:http://dl.acm.org/>.*

* cited by examiner

COGNITIVE EDITOR

BACKGROUND

The present disclosure relates generally to computer systems, and more particularly to methods and systems for cognitive programming editor having the capabilities of policy enforcement and collaborative programming.

A software vulnerability can be seen as a flaw, bug, weakness or even an error in a computer system where the software is operating. The software vulnerability can bring a running process and/or a running computer system down. It may cause the computer system malfunction, or become possible points of attack. In a team effort to develop a large scale software, one mistaken code check-in may cause complier crash, test failure, or at least slow down the progress of the software development. It is desirable to avoid the software vulnerability in the software during its development cycle.

Therefore, heretofore unaddressed needs still exist in the art to address the aforementioned deficiencies and inadequacies.

SUMMARY

In an embodiment of the present invention, a method of cognitive programming editor may include: providing various cognitive characteristics patterns of a group of programmers and programming policies to a code controller, collecting computer code from the programmers through cognitive skill agents of the code controller, analyzing the collected code by the code controller using a cognitive vulnerability checker by learning association code rules, providing collaborative programming by sharing an online editor with the programmers, and storing obtained cognitive characteristics patterns of the programmers to a database. The analyzing may include assessing and responding to cognitive needs of the programmers through the cognitive skill agents.

In another embodiment of the present invention, a computer system of cognitive programming editor may include a group of computers connected through a network. Each of the computers may include at least one processor, and a memory storing computer executable instructions for the cognitive programming editor. When the computer executable instructions are executed at a processor of a computer of the computer system, the computer executable instructions cause the processor to: provide a set of cognitive characteristics patterns of a group of programmers and programming policies to a code controller, collect computer code from the programmers through various cognitive skill agents of the code controller, analyze the collected code by the code controller using a cognitive vulnerability checker, provide collaborative programming by sharing an online editor with the programmers, and store obtained cognitive characteristics patterns of the programmers to a database. In certain embodiments, the computer executable instructions are configured to assess and respond to cognitive needs of the programmers through the cognitive skill agents.

In yet another embodiment of the present invention, the present disclosure relates to a non-transitory computer storage medium. In certain embodiments, the non-transitory computer storage medium stores computer executable instructions. When these computer executable instructions are executed by a processor of one of computers connected through a network, these instructions cause the processor to provide a set of cognitive characteristics patterns of a group of programmers and programming policies to a code controller, collect computer code programmed by the programmers through cognitive skill agents of the code controller, analyze the collected code by the code controller using a cognitive vulnerability checker, provide collaborative programming by sharing an online editor with the programmers, and store obtained cognitive characteristics patterns of the programmers to a database. The computer executable instructions are configured to assess and respond to cognitive needs of the programmers through the cognitive skill agents.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
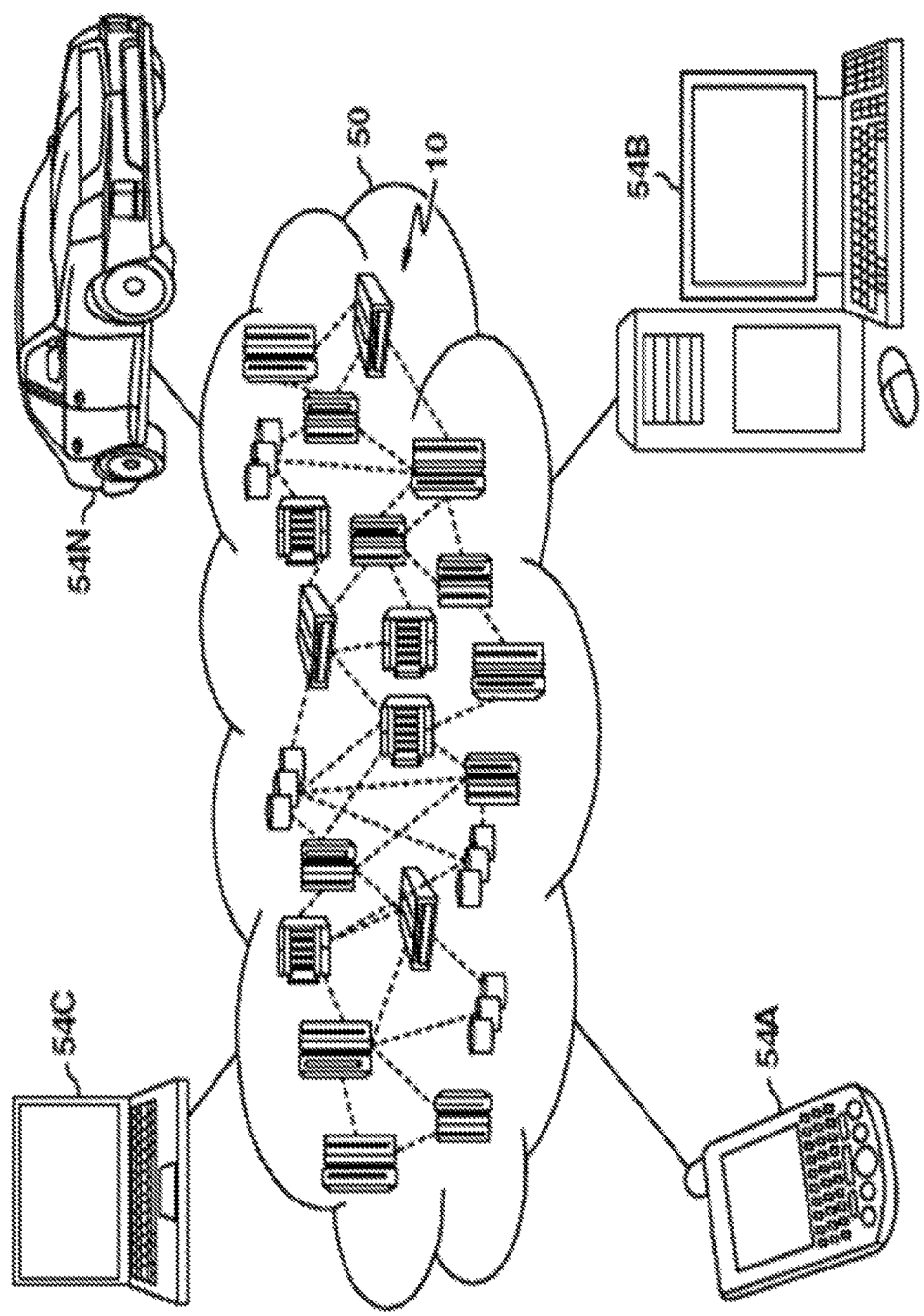
FIG. 1 depicts a cloud computing environment according to an embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

"XSS" stands for cross site scripting.

"SQL" stands for Structured Query Language.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-4, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
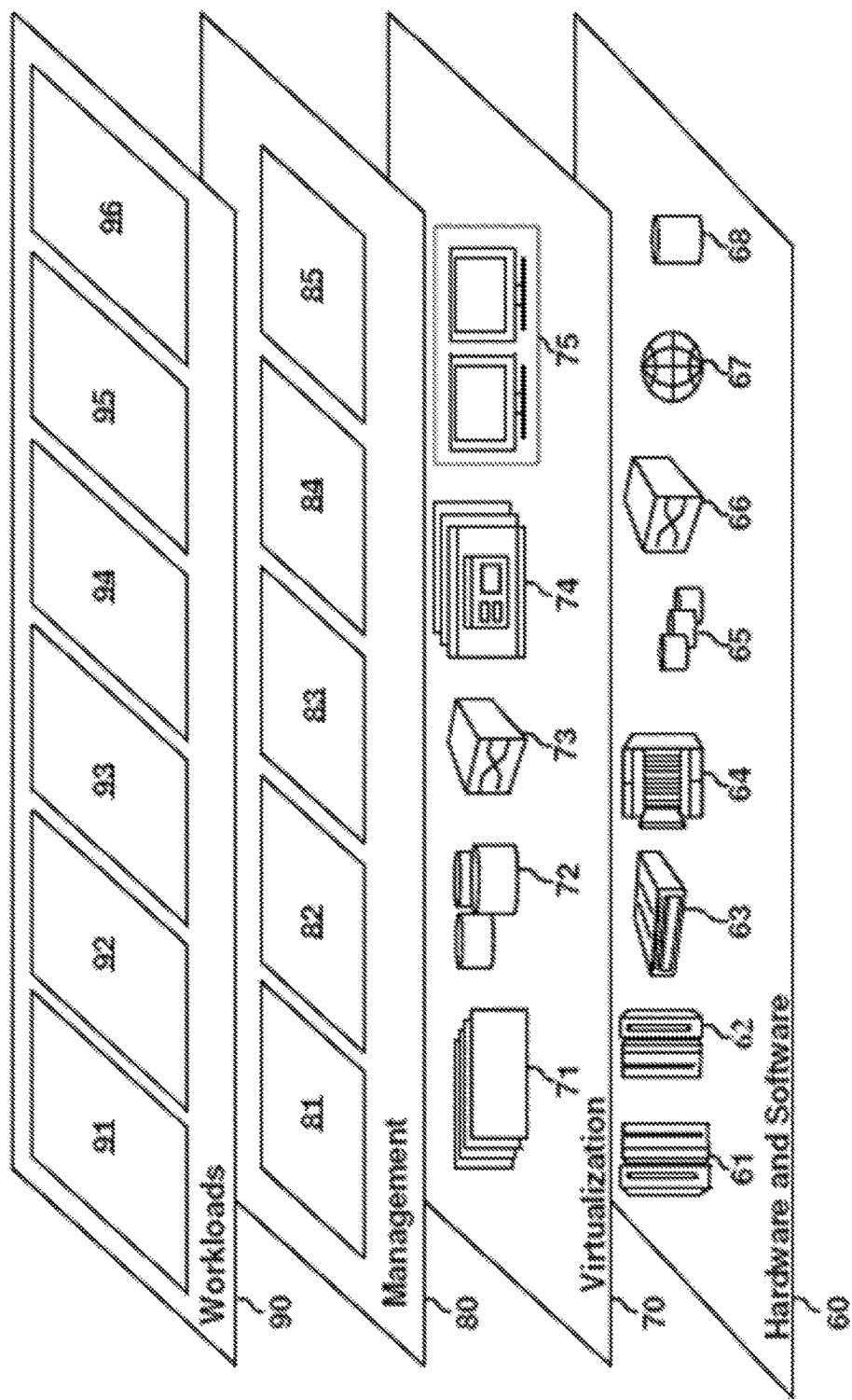
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of messages across multiple communication systems 96.

In accordance with exemplary embodiments of the disclosure, methods, systems and computer program products for prioritizing delivery of messages across multiple communication systems are provided. In exemplary embodiments, a messaging system is configured to receive messages for an individual across multiple communication systems utilized by the individual. The messaging system is also configured to determine a priority level associated with each of the messages based on an analysis of the messages and a user profile of the individual. Based on the determined priority level and the user profile, the messaging system delivers the messages to a desired communication device via a desired messaging system. In exemplary embodiments, the user profile is updated by the messaging system upon receiving feedback from the individual, wherein the feedback includes message delivery preferences and message priority preferences of the individual.

In one embodiment of the present invention, a computer system 100 of cognitive programming editor system may include: one or more computers connected through a network, each of the computers may have at least one processor and a memory. In certain embodiments, the network may include symmetric multiprocessing (SMP) bus, a Peripheral Component Interconnect (PCI) bus, local area network (LAN), wide area network (WAN), telecommunication network, wireless communication network, and the Internet.

Figure 3:
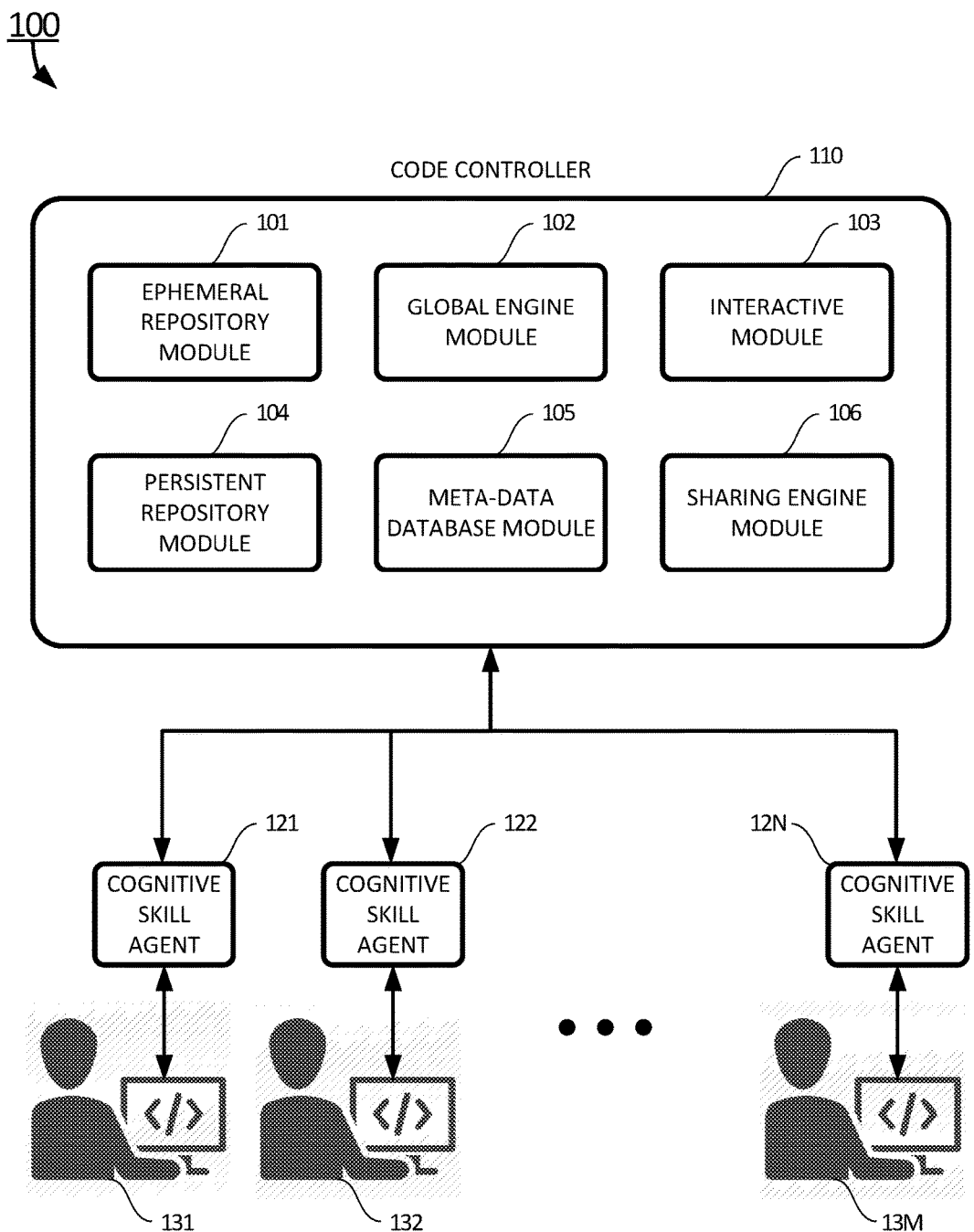
FIG. 3 shows a block diagram of a cognitive programming editor system according to an embodiment of the present invention.

Referring now to FIG. 3, a block diagram of the computer system 100 of the cognitive programming editor system is shown in accordance with exemplary embodiments of the present disclosure. The computer system 100 may include a code controller 110, a number of cognitive skill agents 12$n$, where n=1, 2, . . . , and N, and N is a positive integer and N computers, at least one computer for each of the programmers 13$m$, where m=1, 2, . . . , and M, and M is a positive integer. The computer system 100 is used by the programmers for software development. Each of the programmers may use one or more computers of the computer system 100. Therefore, the number N does not necessarily equal to M.

In certain embodiments, the code controller 110 may include: an ephemeral repository module 101, a global engine module 102, an interactive module 103, a persistent repository module 104, a meta-data database module 105, and a sharing engine module 106.

In certain embodiments, when the programmers start a collaborative code session, the code controller 110 creates the ephemeral repository module 101 to keep track of the code session, and stores various versions of intermediate code in the ephemeral repository module 101. The global engine module 102 maintains programming policies and cognitive characteristics patterns of all programmers. The programming policies may include code syntax, code logic, and code styles. There are too many cognitive characteristics patterns exist in any software to list here. Examples of cognitive characteristics patterns may include:

buffer overflow, buffer underwrite: usually occurs with fixed length buffers when some data is going to be written beyond the boundaries of the current defined capacity;

XSS or cross site scripting: usually associates to web applications, consists in the injection of code in the pages accessed by other programmers or users;

SQL injection: usually occurs in the injection of code with the intention of exploiting the content of a database;

format string bugs: usually happens when external data is given to an output function as format string argument;

integer overflows: usually in two different types, sign conversion bugs and arithmetic overflows; and misc: usually associated with bad privilege assignments, insecure default configurations (passwords/permissions).

The interactive module 103 displays and records various interactive activities: such as texting exchanges, voice mails exchanges, video chats exchanges, and computer screens sharing and displaying during various code sessions. These activities are usually recorded for analysis and discovery of global or personal cognitive characteristics patterns. The interactive module 103 may be used to lock a block of code, to create tests for any selected block of code, to collect code lines created, deleted, and modified for a code session, to test the code blocks and modifications for resolutions, and to collect code lines created, deleted, and modified by each of the programmers.

The persistent repository module 104 stores code results of a code session after various verifications and testing for version control purpose. The meta-data database module 105 stores various program meta-data, and global and personal cognitive characteristics patterns meta-data. The sharing engine module 106 allows all programmers to share an online editor, a code session, and to view current version of the code, and various highlights, colorizations, and warnings as the code session progresses.

In certain embodiments, the cognitive skill agent 12n is associated with a programmer and operating on the computer the programmer is currently using. Cognitive skill agent may consider cognitive needs of a programmer when making suggestions for code updates. In certain embodiments, a programmer may be assessed to have certain needs with respect to cognitive characteristics of the programmers and cognitive loads of the programming task that are placed upon a programmer. For example, the programmer may not even realize that he/she may find an application or function(s) to be same, similar, or complementary with respect to cognitive load, ease of use, syntax, etc., or have such a need that should be met. The code controller 110 may determine this need by monitoring his/her programming skills, past interactions with code and team members, including difficulty of using some functions, need to integrate new capabilities, a fall-off of efficiency due to distractions or updates provided by the new coding features or other software running at the same time, etc. Someone with autism, pre-Alzheimers, or who is below a certain age, etc. may have certain programming patterns, needs, and desires, and the cognitive skill agent may take these needs and characteristics into consideration. Alternatively, a programmer may consciously realize she has certain cognitive needs, desires, etc. and these may be specified in a personal cognitive characteristics patterns profile for the programmer or a group cognitive characteristics patterns profile of a group of programmers. Thus, in this case, these personal or group cognitive characteristics patterns profiles may be used by the cognitive skill agent when making suggestions for code corrections. In hackathons such profiles may be established by team leads.

Figure 4:
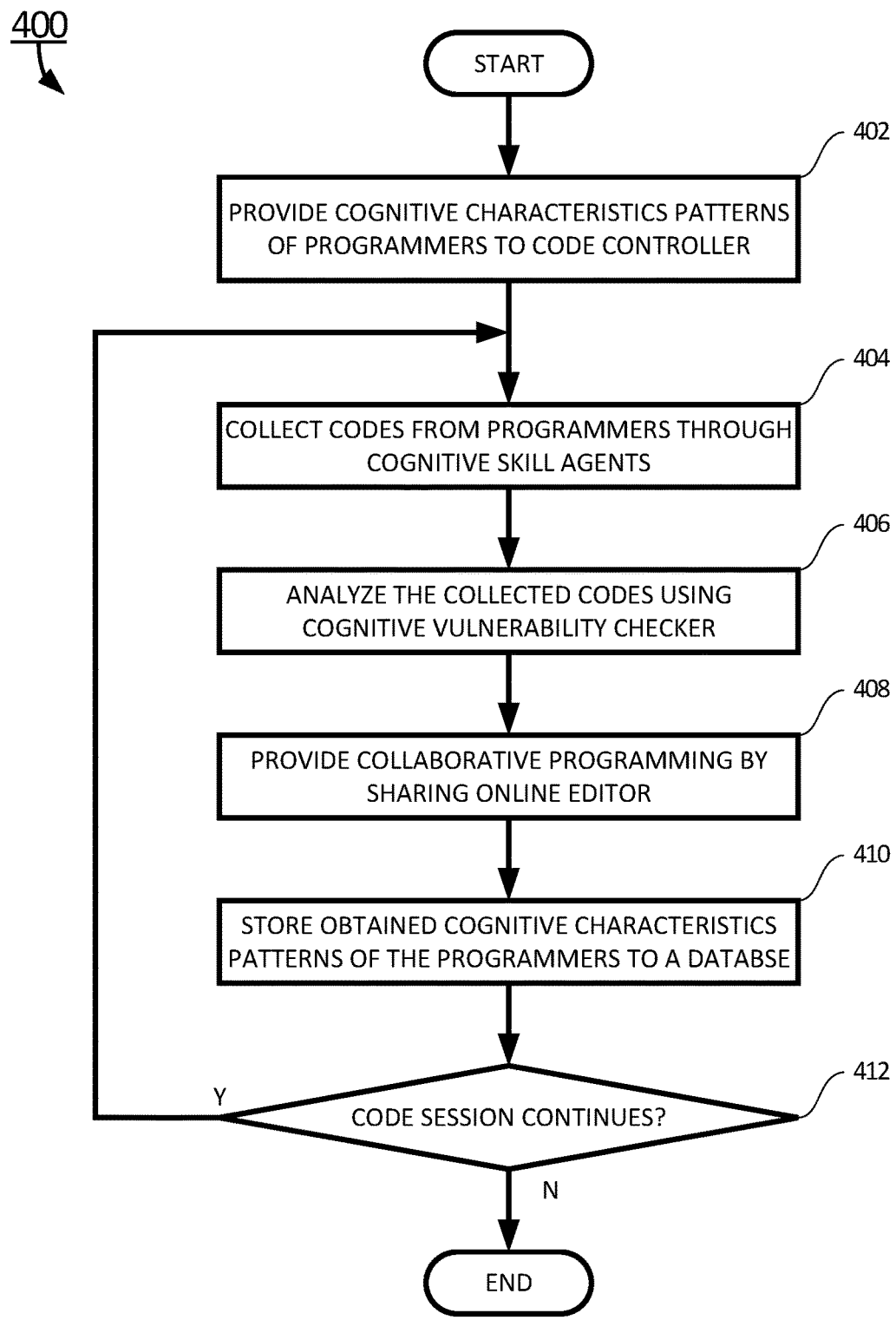
FIG. 4 is a flow chart of an exemplary method of a cognitive programming editor system according to an embodiment of the present invention.

Referring now to FIG. 4, a flow chart of an exemplary method 400 of a cognitive programming editor system is shown according to certain exemplary embodiments of the present disclosure.

As shown at block 402, the computer system 100 provides certain global cognitive characteristics patterns, and personal cognitive characteristics patterns of each of the programmers to the code controller 110, and these vulnerability characteristics patterns of the programmers are stored in the global engine module 102, and the meta-data of these vulnerability characteristics patterns of the programmers is stored in the meta-data database module 105.

At block 404, the programmers start a code session and the code controller 110 continuously collects the code from the participating programmers through their respective cognitive skill agents.

At block 406, the collected code from a live code session is temporarily stored in the ephemeral repository module 101, and analyzed by the global engine module 102 using a cognitive vulnerability checker. In certain embodiments, the cognitive vulnerability checker may include character pattern matching, type qualifier, data flow analysis, vulnerability pattern-based model checking, and individual programmer vulnerability analysis. The analysis may be performed on by a cloud computing system.

At block 408, the code controller 110 provides a collaborative programming environment to the programmers continuously through the sharing engine module 106 during the code session. The collaborative programming may include: providing real-time feedback, providing real-time control of composite code formed by the collaboration of the programmers, learning vulnerabilities over time for different programmers and teams using association rule learning, enforcing the programmers to follow syntax, logic, and style according to the programming policies, providing warnings, code control features, suggestions for use of particular programmer based on a vulnerability risk level for the cohorts, and colorizing lines of code according to the vulnerability risk level for the cohorts. The colorizing may include a multidimensional representation of risk and cognitive characteristics for the programmers, and a multidimensional representation of risk and cognitive characteristics for the programmers in a virtual world for additional features. The composition of the programmers and the risk and cognitive characteristics for the programmers may change through time.

In certain embodiments, the code controller 110 learns the time-varying vulnerabilities for different programmers using association rule learning. The code controller 110 performs code analysis to find out vulnerability cause graph node using association rule learning. The code controller 110 uses an algorithm to perform a breadth-first search strategy to sweep through the code and uses a candidate generation function which exploits the downward closure property of support. For example, there are at least two scenarios where a nonadaptive buffer may overflow. First, when size of external data is greater than the size of the nonadaptive buffer. Second, when two integers are multiplied, the buffer may overflow if the sizes of the two integers are not checked. For example, if both integers are not to exceed 1000, then the result of the multiplication of these two integers will not exceed 1,000,000. However, if the buffer size is set to 1,000,000, and the two integers are not checked or limited to 1000, then the nonadaptive buffer may overflow. Therefore, it is necessary to sweep through the code, and ascertain that every place where nonadaptive buffer is used is checked for buffer overflow, especially for certain programmers who have shown patterns that they frequently make similar mistakes. Other examples may include the use of memory allocation functions such as malloc, calloc, realloc, and alloca.

In certain embodiments, the code controller 110 learns the time-varying vulnerabilities for different programmers in a collaborative setting and provides programmer suggestions as annotations on the code, in real-time as the code evolves. For example: one short block of code may turn purple, to indicate that programmers with any of the following features are suggested to reduce risk levels: programmers with 3D spatial skills, programmers who tend to focus on small details, and/or programmers who tend to be more holistic in their approach and see overall features, needs, and flows.

In certain exemplary embodiments, when two pieces of code (e.g. from different programmer groups) are combined, the code controller 110 provides suggestions or alerts relating to information on the programmers who programmed the code. For example: if one of the programmers worked on a pieces of code that is ready to be merged together (or interfaced with) another piece of code, and these two programmers are very different, then the code controller 110 may do any of: quarantine the merger until a supervisor gives an OK, provide visualizations of risk in the programmers' displays, actually prevents the merger until certain checking is performed, suggests that a third team do a quick examination of the merger, etc.

In certain embodiments, the programmers need not be humans. The programmers may be artificial intelligence (AI) agents and programming assistants in the form of AI agents. The AI agents and AI assistants may have different characteristics, tendencies, abilities, and associated known vulnerabilities/risks.

In certain embodiments, the code controller 110 may include a built-in function that automatically monitors any violations and corrects the programming codes on the fly, and provide a collaborative (peer) programming environment. Software enterprises may use the cognitive programming editor system to enforce their programming polices into the editor so that programmers can see code analysis before checking in the code. Software enterprises may also use the cognitive programming editor system to enforce the peer programming in their development/operation life cycle.

In additional to programming, the collaborative programming environment allows interactive testing of the code generated by the programmers. For example: a programmer (or a collaborator) can highlight a block of code and issue a test. The code controller 110 checks the validity of the block such as a function, method, and module. The code controller 110 may automatically create unit tests and runs the tests. The tests can be directed to any small selected code block, not necessarily the entire project.

In certain embodiments, the tests also checks the coding styles, patterns against the programming policies stored in the meta-data database module 105. For example, the code controller 110 examines how the code accesses other components. If the code is accessing certain database such as MongoDB and not using an authentication mechanism, then the MongoDB will be vulnerable to external attacks. The code controller 110 looks up certain compatible code from a knowledge base (maybe a part of the meta-data database module 105), which. Then the code controller 110 may suggest the code that uses an authentication mechanism to the programmer.

In certain embodiments, the code controller 110 enforces certain programming policies stored in the meta-data database module 105 through the cognitive skill agents. The code controller 110 displays various colorized highlights to indicate syntax warnings (e.g. language-specific syntax, custom syntax, etc.), code style warnings (e.g. CamelCase, snakeCase, indentations, new lines, function definitions, and space usage, etc.), and logic warnings (e.g. certain elements used prior to they are defined, variable scopes, and variable type not checked, etc.)

At block 410, all global cognitive characteristics patterns and personal cognitive vulnerability profiles obtained in the continuous code session are collected and stored in the meta-data database module 105. This collection grows as the code session continues. In certain embodiments, certain personal cognitive vulnerability profiles may be updated as the programmer joins the code session, and achieved while the programmer leaves the code session.

At a query block 412, the method 400 normally continues to block 404 to continue the code session. When the code session ends, the method 400 proceeds to close the code session after all global cognitive characteristics patterns and personal cognitive vulnerability profiles are updated and stored in the meta-data database module 105.

In another embodiment of the present invention, a computer system of cognitive programming editor system may include a group of computers connected through a network. Each of the computers may include at least one processor, and a memory storing computer executable instructions for the cognitive programming editor. when the computer executable instructions are executed at a processor of a computer of the computer system, the computer executable instructions cause the processor to: provide a set of cognitive characteristics patterns of a group of programmers and programming policies to a code controller, collect computer code from the programmers through various cognitive skill agents of the code controller 110, analyze the collected code by the code controller 110 using a cognitive vulnerability checker, provide collaborative programming by sharing an online editor with the programmers, and store obtained cognitive characteristics patterns of the programmers to the meta-data database module 105. In certain embodiments, the computer executable instructions are configured to assess and respond to cognitive needs of the programmers through the cognitive skill agents.

In yet another embodiment of the present invention, the present disclosure relates to a non-transitory computer storage medium. In certain embodiments, the non-transitory computer storage medium stores computer executable instructions. When these computer executable instructions are executed by a processor of one of computers connected through a network, these instructions cause the processor to provide a set of cognitive characteristics patterns of a group of programmers and programming policies to a code controller 110, collect computer code programmed by the programmers through cognitive skill agents of the code controller 110, analyze the collected code by the code controller 110 using a cognitive vulnerability checker, provide collaborative programming by sharing an online editor with the programmers, and store obtained cognitive characteristics patterns of the programmers to the meta-data database module 105. The computer executable instructions are configured to assess and respond to cognitive needs of the programmers through the cognitive skill agents.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of a cognitive programming editor system comprising:
    providing a plurality of cognitive characteristics patterns of a plurality of programmers and programming policies to a code controller;
    collecting code from the plurality of programmers through a plurality of cognitive skill agents of the code controller;
    analyzing the collected code by the code controller using a cognitive vulnerability checker;
    providing collaborative programming by sharing an online editor with the plurality of programmers; and
    storing obtained cognitive characteristics patterns of the plurality of programmers to a database,
    wherein the providing collaborative programming comprises:
        providing real-time feedback and control of composite code formed by collaboration of the plurality of programmers;
        learning vulnerabilities using association rule learning over time for different programmers and teams;
        enforcing the plurality of programmers to follow syntax, logic, and style according to the programming policies;
        providing warnings, code control features, suggestions for use of particular programmer based on vulnerability risk level for the programmers; and
        colorizing lines of code according to the vulnerability risk level for the programmers.

2. The method of claim 1, wherein the analyzing comprises assessing and responding to cognitive needs of the plurality of programmers through the plurality of cognitive skill agents.

3. The method of claim 1, wherein the cognitive vulnerability checker comprises: character pattern matching, type qualifier, data flow analysis, vulnerability pattern-based model checking, and individual programmer vulnerability analysis.

4. The method of claim 3, wherein colorizing comprises:
    a multidimensional representation of risk and cognitive characteristics for the plurality of programmers; and
    a multidimensional representation of risk and cognitive characteristics for the plurality of programmers in a virtual world for additional features,
    wherein the plurality of programmers and the risk and cognitive characteristics for the plurality of programmers may change through time.

5. The method of claim 1, wherein the analyzing comprises analyzing the collected code in a cloud computing system.

6. The method of claim 1, wherein the plurality of programmers comprises a plurality of artificial intelligent (AI) agents, and a plurality of AI assistants.

7. A computer system comprising:
    a plurality of computers connected through a network, wherein each of the plurality of computers comprises at least one processor; and a memory storing computer executable instructions for a cognitive programming editor, wherein when executed at a processor of a computer of the computer system, the computer executable instructions cause the processor to perform:
        providing a plurality of cognitive characteristics patterns of a plurality of programmers and programming policies to a code controller;
        collecting code from the plurality of programmers through a plurality of cognitive skill agents of the code controller;
        analyzing the collected code by the code controller using a cognitive vulnerability checker;
        providing collaborative programming by sharing an online editor with the plurality of programmers; and
        storing obtained cognitive characteristics patterns of the plurality of programmers to a database,
    wherein the providing collaborative programming comprises:
        providing real-time feedback and control of composite code formed by collaboration of the plurality of programmers;
        learning vulnerabilities using association rule learning over time for different programmers and teams;
        enforcing the plurality of programmers to follow syntax, logic, and style according to the programming policies;
        providing warnings, code control features, suggestions for use of particular programmer based on vulnerability risk level for the programmers; and
        colorizing lines of code according to the vulnerability risk level for the programmers.

8. The computer system of claim 7, wherein the computer executable instructions are configured to assess and respond to cognitive needs of the plurality of programmers through the plurality of cognitive skill agents.

9. The computer system of claim 7, wherein the cognitive vulnerability checker comprises: character pattern matching, type qualifier, data flow analysis, vulnerability pattern-based model checking, and individual programmer vulnerability analysis.

10. The computer system of claim 9, wherein the computer executable instructions are configured to:
    provide a multidimensional representation of risk and cognitive characteristics for the plurality of programmers; and
    provide the multidimensional representation of risk and cognitive characteristics for the plurality of programmers in a virtual world for additional features,
    wherein the plurality of programmers and the risk and cognitive characteristics for the plurality of programmers may change through time.

11. The computer system of claim 7, wherein the computer executable instructions are configured to analyze the collected code by the code controller using a cognitive vulnerability checker in a cloud computing system.

12. A non-transitory computer storage medium having computer executable instructions stored thereon which, when executed by a processor of one of a plurality of computers connected through a network, cause the processor to perform:
    providing a plurality of cognitive characteristics patterns of a plurality of programmers and programming policies to a code controller;
    collecting code from the plurality of programmers through a plurality of cognitive skill agents of the code controller;
    analyzing the collected code by the code controller using a cognitive vulnerability checker;
    providing collaborative programming by sharing an online editor with the plurality of programmers; and
    storing obtained cognitive characteristics patterns of the plurality of programmers to a database,
    wherein the providing collaborative programming comprises:

providing real-time feedback and control of composite code formed by collaboration of the plurality of programmers;

learning vulnerabilities using association rule learning over time for different programmers and teams;

enforcing the plurality of programmers to follow syntax, logic, and style according to the programming policies;

providing warnings, code control features, suggestions for use of particular programmer based on vulnerability risk level for the programmers; and colorizing lines of code according to the vulnerability risk level for the programmers.

13. The non-transitory computer storage medium of claim 12, wherein the computer executable instructions are configured to assess and respond to cognitive needs of the plurality of programmers through the plurality of cognitive skill agents.

14. The non-transitory computer storage medium of claim 12, wherein the cognitive vulnerability checker comprises: character pattern matching, type qualifier, data flow analysis, vulnerability pattern-based model checking, and individual programmer vulnerability analysis.

15. The non-transitory computer storage medium of claim 12, wherein the computer executable instructions are configured to:

provide a multidimensional representation of risk and cognitive characteristics for the plurality of programmers; and provide the multidimensional representation of risk and cognitive characteristics for the plurality of programmers in a virtual world for additional features, wherein the plurality of programmers and the risk and cognitive characteristics for the plurality of programmers may change through time.

16. The non-transitory computer storage medium of claim 12, wherein the computer executable instructions is configured to analyze the collected code by the code controller using a cognitive vulnerability checker in a cloud computing system.

17. The non-transitory computer storage medium of claim 12, wherein the plurality of programmers comprises a plurality of artificial intelligent (AI) agents, and a plurality of AI assistants.

* * * * *